United States Patent [19]

Ageta

[11] Patent Number: 4,668,146
[45] Date of Patent: May 26, 1987

[54] EXPLOSION PROOF CONSTRUCTION OF MOTOR ROBOT

[75] Inventor: Kosei Ageta, Kobe, Japan

[73] Assignee: Kabushiki Kaisha Kobe Seiko Sho, Kobe, Japan

[21] Appl. No.: 791,435

[22] Filed: Oct. 25, 1985

[51] Int. Cl.⁴ .............................................. B25J 3/00
[52] U.S. Cl. .......................................... 414/4; 310/66; 310/88; 310/112; 310/114; 901/23; 901/27; 901/49
[58] Field of Search ...................... 310/66, 88, 177, 55, 310/112, 114; 318/568; 414/4, 735; 901/15, 23, 24, 27, 49

[56] References Cited

U.S. PATENT DOCUMENTS

| | | | |
|---|---|---|---|
| 1,558,936 | 10/1925 | Simons | 310/112 |
| 3,091,710 | 5/1963 | Shartrand | 310/55 |
| 3,512,024 | 5/1970 | Papa | 310/88 |
| 3,634,873 | 1/1972 | Nishimura | 310/88 |
| 3,817,403 | 6/1974 | Glachet | 901/23 |
| 3,826,383 | 7/1974 | Richter | 414/4 |
| 3,898,838 | 8/1975 | Connelly | 318/568 |
| 4,188,166 | 2/1980 | Moreau | 414/4 |
| 4,298,308 | 11/1981 | Richter | 310/568 |
| 4,441,854 | 4/1984 | DiMatteo | 901/49 |
| 4,481,591 | 11/1984 | Spongh | 318/568 |

Primary Examiner—R. Skudy
Attorney, Agent, or Firm—Oblon, Fisher, Spivak, McClelland & Maier

[57] ABSTRACT

A sealed type internal pressure explosion proof robot motor assembly. The robot has a plurality of arms pivotably connected thereto and is used in an explosive atmosphere. Each arm is formed with an airtight chamber in which an electric motor is encased. These chambers are connected to one another so as to communicate by means of sealed hoses encasing wiring therein. Air or gas of a pressure above atmospheric pressure is supplied to the chamber through the hose. The electric motor is a DC print motor.

2 Claims, 1 Drawing Figure

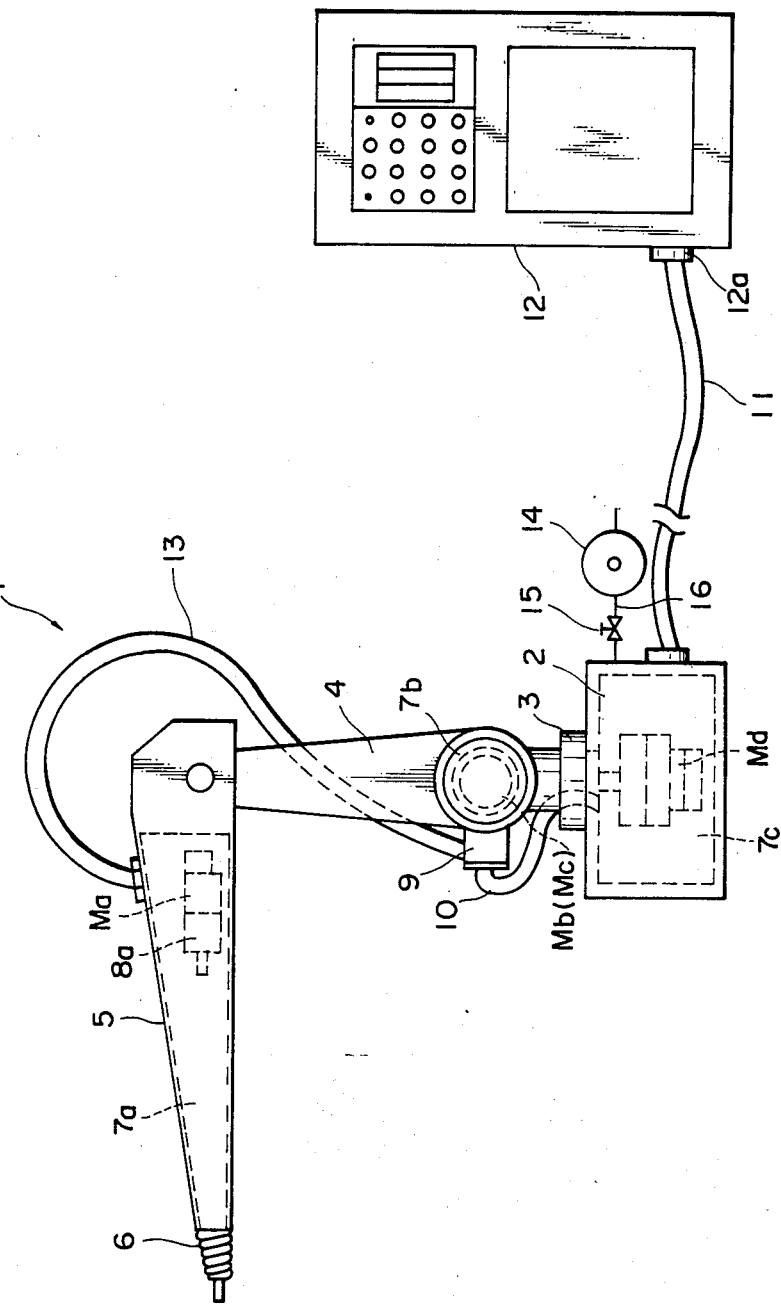

EXPLOSION PROOF CONSTRUCTION OF MOTOR ROBOT

BACKGROUND OF THE INVENTION

1. Field of the Invention

The present invention relates to an explosion proof motor robot assembly, and particularly to a high safety sealed type internal pressure explosion proof assembly.

2. Description of the Prior Art

In coating robots, built-up robots used under the explosion atmosphere and other working robots, there is a possible danger of explosion due to sparks or the like generated by wire breakage or motor breakdown. Prior art driving devices for these robots are of a so-called essentially safety explosion proof assembly which uses a hydraulic cylinder free from a possibility of occurrence of a spark. These hydraulic driving systems are inferior to driving mechanisms using an electric motor in the light of the fact that fine locating cannot be carried out, a complicated exchange of coordinates is necessary, and a hydraulic unit which occupies a relatively wide space is required. For these reasons, even in the coating robot, a robot of a so-called increased safety explosion proof assembly driven by a brushless DC servo-motor has been developed.

However, the aforesaid brushless DC servo-motor is merely relatively high in safety as compared with general DC motors and is not a perfect explosion proof assembly. This brushless DC servo-motor can be applied to an explosive atmosphere place of class 3 which is an open working place but cannot be applied to the dangerous location of classes 1 and 2 such as enclosed rooms.

In addition, such a brushless DC servo-motor has a great inertia and is not suitable for a coating robot which greatly varies in acceleration and deceleration, thus giving rise to a great energy loss.

Japanese Patent Application Laid-Open Nos. 25695/85, 54758/85 and 54759/85 disclose the art of a so-called ventilation type internal pressure explosion proof assembly in which an electric motor is encased in a motor unit provided in an arm of a motor robot, and an air supply hose and an air discharge hose are connected to the motor unit so that fresh air is fed into the motor unit through the air supply hose and is finally discharged out of the motor unit through the air discharge hose. However, in the ventilation type internal pressure explosion proof assembly, each motor unit must be provided with an air supply source. Since this assembly is of the ventilation type, a large-capacity air supply source is required to maintain pressure within the motor unit at a level above atmospheric pressure, and air consumption is also great.

Furthermore, the prior art construction has a disadvantage in that a pressure detector has to be provided for each motor unit due to unevenness of pressures in the motor units.

SUMMARY OF THE INVENTION

It is therefore an object of the present invention to provide a motor-driven robot which can assuredly provide a safety equivalent to that of the essentially safety explosion proof while overcoming the aforesaid disadvantages. More specifically, the present invention provides an explosion proof motor robot assembly (a so-called sealed type internal pressure explosion proof assembly), said robot having a plurality of arms pivotably connected thereto and used under an explosive atmosphere, in which airtight chambers are formed in said plurality of arms, respectively, an electric motor is encased in each of the airtight chambers, said airtight chambers being connected to one another in a communicated fashion by means of sealed hoses encasing wiring therein, and air or inert gas having pressure in excess of atmospheric pressure is supplied to each airtight chamber through the hose.

For better understanding, the construction according to the present invention will be described in connection with a specific embodiment with reference to the accompanying drawing.

BRIEF DESCRIPTION OF THE DRAWING

FIG. 1 is a schematic side view of a coating robot which is taken as one embodiment according to the present invention.

DETAILED DESCRIPTION OF THE PREFERRED EMBODIMENT

Referring to FIG. 1, a coating robot comprises a turning bed 3 which is turnable around a vertical shaft on a base cabinet 2 mounted on the foundation, the turning bed 3 having a pivotable vertical arm 4 in a vertical plane.

The vertical arm 4 has a horizontal arm 5 pivotable in a vertical plane which is the pivotable plane of the vertical arm 4, said arm 5 being positioned at the extreme end of the arm 4. A wrist portion 6 mounted on the extreme end of the horizontal arm 5 is guided to a suitable position by the turning motion of the turning bed 3 and by the pivotal motion of the vertical arm 4 and horiziontal arm 5, and the wrist portion 6 is further bent in a suitable direction to thereby impart a suitable attitude to the coating gun (not shown) attached to the extreme end of the wrist portion 6 for accomplishment of coating work in accordance with the working locus as instructed.

In this embodiment, the horizontal arm 5 has an airtight chamber 7a therein, and the airtight chamber 7a is interiorly provided with an electric motor Ma for driving the wrist portion 6. The electric motor Ma itself comprises a non-explosion proof DC print motor, and is connected to the wrist portion 6 through a reduction gear 8a. A power transmission mechanism between the reduction gear 8a and the wrist portion 6 used herein is well-known, which is therefore not shown.

The vertical arm 4 has a second airtight chamber 7b provided in a center portion of a pivot point, and an electric motor Mb such as a DC print motor for rocking and driving the horizontal arm 5 is housed in the second airtight chamber 7b. The second airtight chamber 7b is further interiorly provided with an electric motor Mc for rocking and driving the vertical arm 4.

A third airtight chamber 7c is disposed within the base cabinet 2. The turning bed 3 is turned about a vertical shaft by an electric motor Md such as a DC print motor housed in the third airtight chamber 7c.

A relay terminal box 9 for electric writing is mounted on the side of the vertical arm 4. The interior of a relay termainal box 9 is of the sealed construction, and the sealed internal space is sealingly communicated with the third airtight chamber 7c.

The airtight chamber 7c within the base cabinet 2 is connected with the sealed internal space within the relay terminal box 9 in communication by means of a sealed hose 10, the hose 10 encasing therein wirings for energizing the electric motors Ma, Mb and Mc.

These wirings are connected, along with a wiring for the electric motor Md for driving the turning bed 3, to a control unit 12 externally of a booth through a sealed hose 11 connected to the base cabinet.

The extreme end of a sealed hose 13 connected to the sealed internal space of the relay terminal box 9 is connected in communication to the airtight chamber 7a provided within the horizontal arm 5, and a wiring assembly encased in the hose 13 is connected to the electric motor Ma.

The airtight chamber 7c within the case cabinet 2 is connected to a cylinder 14 containing high pressure inert gas therein by means of a pipe 16 through a valve 15.

Accordingly, when the valve 15 is opened, the high pressure inert gas passing through the pipe 16 from the cylinder 14 flows into the airtight chamber 7c within the base cabinet 2 so as to fill the airtight chamber 7c, and flows into the sealed internal space within the relay terminal box 9 passing through the hose 10 to be filled within the sealed internal space, after which the gas flows into the second airtight chamber 7b.

The inert gas which has entered the airtight chamber 7c within the base cabinet 2 further passes through the hose 11 and reaches a hose connection portion 12a of the control unit 12 so that the hose 11 is filled with the gas. In this manner, the hose 11, the third airtight chamber 7c, the hose 10, the relay terminal box 9 and the second airtight chamber 7b are filled with the inert gas to prevent generation of sparks from the wirings and the electric motors Mc, Mb and Md etc. provided therein.

The inert gas which has entered the hose 13 from the relay terminal box 9 flows into the first airtight chamber 7a to be filled within the first airtight chamber 7a to thereby prevent the generation of sparks from the electric motor Ma housed in the first airtight chamber 7a and the wiring within the hose 13.

The inert gas supplied from the pipe 16 to the third airtight chamber 7c within the base cabinet 2 passes through the hoses 11, 10 and 13 serves to provide the explosion proof characteristic of the wirings disposed within these hoses. The inert gas which has entered the airtight chambers 7a, 7b and 7c and the relay terminal box 9 through the hoses serves to provide the explosion proof characteristic of the motors and wiring portions within the airtight chambers and the terminal coupling portions.

Where there are present clearances resulting from damage to the airtight chambers and hoses in communication with the exterior, the inert gas is prevented from escaping through the clearances so that the external explosive gas may flow into the airtight chambers and hoses.

Accordingly, when the outflow of the inert gas from the cylinder increases to lower the pressure of the cylinder 16, a sufficient explosion proof action is not effected. Therefore, pressure in the cylinder 16 or the airtight chambers may be detected and when this pressure decreases to a level below a predetermined value, and an alarm is produced or a valve for switching the connection with a new cylinder can be functioned.

While in the above-described embodiment, the inert gas is used as gas to be filled in the airtight chambers and hoses, it is to be understood that according to the concept of the present invention, internal pressure may be applied into the airtight chambers and hoses to prevent flowing of the explosive gas into portions where a spark is liable to occur so that the external explosive gas may not flow into the airtight chambers or the like. Therefore, air or the like may also be used as the gas to be filled in the airtight chambers or similar structure.

Since the hose 11 has one end connected to the base cabinet 2 and the other end connected externally of the booth, that is, to the control unit 12 installed under the non-explosive atmosphere, as described above, filling of the inert gas or air into the hose 11 may be effected only at a portion of the hose 11 within the explosive atmosphere. Thus, the high pressure gas may be filled up to the connection portion 12a between the hose 11 and the control unit 12 at a maximum.

As described above, the present invention provides the sealed type internal pressure explosive proof motor robot, assembly said robot having a plurality of arms pivotably connected thereto and used under the explosive atmosphere, characterized in that airtight chambers are formed in said plurality of arms, respectively, electric motors are respectively encased in said airtight chambers, wherein said airtight chambers are connected to one another by means of sealed hoses encasing wiring therein, and air or inert gas having pressure in excess of atmospheric pressure is supplied to each of the airtight chambers through said hoses. Therefore, an electric motor can be used as a source for driving the robot. Fine positioning operation can be accomplished and control accuracy is increased. Since no hydraulic unit is required, the whole robot may be miniaturized. Furthermore, since a robot of the perfect internal pressure explosion proof type is provided, a motor having great inertia such as a conventional brushless DC servomotor need not be used as an electric motor. For example, an explosive proof motor having small inertia such as a DC print motor can be used, which may be applied to a robot which greatly varies in acceleration and deceleration such as a coating robot to minimize the use of energy, which is very suitable.

The construction of the present invention is such as to be extremely easy to maintain and manage as compared with the hydraulic driving type and has various merits. The present invention is this of an internal pressure explosive proof construction and therefore, a degree of safety equal to an essentially safety explosive proof is obtained and the invention can be utilized even for dangerous places of at least a class 2 rating.

Moreover, a present invention employs the sealed type internal pressure explosion proof assembly. Since the airtight chambers are connected in series by means of hoses, the present assembly will suffice to have a small capacity air supply source as compared with that of the ventilation type internal pressure explosion proof assembly, and the amount of air consumption is also small.

In the present invention, the pressure in each of the airtight chambers is the same due to the sealed type, and therefore, a single pressure detector will suffice. Moreover, a serially connected cable is used. Therefore, the construction of the present invention is simple in terms of the wiring used and the like as compared with the ventilation type in which each cable is connected to each motor unit. In addition, a small load an the robot itself will suffice. As can thus be appreciated mentioned above, the present invention has many advantages.

What is claimed is:

1. A motor robot assembly, comprising:

a plurality of arms pivotably interconnected and which are capable of being exposed to an explosive atmosphere, each of said arms having an airtight chamber formed therein;

an electric motor encased in each of said airtight chambers;

means for interconnecting said airtight chambers to one another and which further comprises at least one sealed hose encasing wiring therein; and means for supplying gas having pressure higher than atmospheric pressure to each of said airtight chambers through said at least one hose.

2. The explosion proof construction according to claim 1, wherein said electric motor further comprises a DC print motor.

* * * * *